United States Patent
Hashimoto et al.

(10) Patent No.: US 9,641,055 B2
(45) Date of Patent: May 2, 2017

(54) METHOD FOR MANUFACTURING LAMINATED IRON CORE

(71) Applicants: MITSUI HIGH-TEC, INC., Fukuoka (JP); PANASONIC CORPORATION, Osaka (JP)

(72) Inventors: Akihiro Hashimoto, Fukuoka (JP); Tadashi Iida, Fukuoka (JP); Kiyomi Kawamura, Osaka (JP); Koichi Mitamura, Osaka (JP)

(73) Assignees: MITSUI HIGH-TEC, INC., Fukuoka (JP); PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/742,012

(22) Filed: Jun. 17, 2015

(65) Prior Publication Data
US 2015/0372572 A1    Dec. 24, 2015

(30) Foreign Application Priority Data
Jun. 18, 2014    (JP) ................. 2014-125546

(51) Int. Cl.
*H02K 15/02*    (2006.01)
*B21D 28/10*    (2006.01)
(Continued)

(52) U.S. Cl.
CPC ............. *H02K 15/03* (2013.01); *H02K 15/02* (2013.01); *B21D 28/10* (2013.01); *B21D 28/22* (2013.01);
(Continued)

(58) Field of Classification Search
CPC ...... H02K 15/02; H02K 15/03; H02K 15/024; Y10T 156/1075; Y10T 156/1002;
(Continued)

(56) References Cited

U.S. PATENT DOCUMENTS

| | | | |
|---|---|---|---|
| 6,636,137 B1 * | 10/2003 | Neuenschwander | .. B21D 28/02 29/596 |
| 2008/0276446 A1 | 11/2008 | Amano et al. | |

(Continued)

FOREIGN PATENT DOCUMENTS

| | | |
|---|---|---|
| DE | 10227129 | 1/2004 |
| JP | 2006-050821 | 2/2006 |

(Continued)

OTHER PUBLICATIONS

U.S. Appl. No. 14/741,924 to Akihiro Hashimoto et al., which was filed Jun. 17, 2015.
(Continued)

*Primary Examiner* — Linda L Gray
(74) *Attorney, Agent, or Firm* — Greenblum & Bernstein, P.L.C.

(57) ABSTRACT

In a method for manufacturing a laminated iron core from a thin sheet, the method includes coining the thin sheet from above to form a thinned bridge portion on an outer peripheral portion of an iron core piece, blanking the iron core piece downwardly from the thin sheet using a set of an outer-shape blanking punch and a die after forming the bridge portion, wherein the outer-shape blanking punch includes a projection portion fitted into the bridge portion when blanking, and laminating the iron core piece on another iron core piece to manufacture the laminated iron core.

11 Claims, 5 Drawing Sheets

(51) Int. Cl.
*H02K 15/03* (2006.01)
*B65H 35/00* (2006.01)
*B21D 28/22* (2006.01)
*B21D 28/26* (2006.01)
*B21D 28/24* (2006.01)

(52) U.S. Cl.
CPC ............ *B21D 28/246* (2013.01); *B21D 28/26* (2013.01); *B65H 35/0006* (2013.01); *B65H 35/008* (2013.01); *H02K 15/024* (2013.01); *Y10T 156/1002* (2015.01); *Y10T 156/1056* (2015.01); *Y10T 156/1075* (2015.01); *Y10T 156/13* (2015.01); *Y10T 156/1304* (2015.01)

(58) Field of Classification Search
CPC ............ Y10T 156/1056; Y10T 156/13; Y10T 156/1304; B65H 35/0006; B65H 35/008; B21D 28/10; B21D 28/22; B21D 28/246; B21D 28/26; B21D 28/265; B21B 35/00
See application file for complete search history.

(56) References Cited

U.S. PATENT DOCUMENTS

2010/0083486 A1    4/2010   Amano et al.
2011/0179633 A1    7/2011   Amano et al.

FOREIGN PATENT DOCUMENTS

| | | |
|---|---|---|
| JP | 2008-042967 | 2/2008 |
| JP | 2012-016090 | 1/2012 |

OTHER PUBLICATIONS

Office Action issued in Germany Counterpart Patent Appl. No. 102015211190.3, dated Apr. 4, 2016, along with an English translation thereof.

\* cited by examiner

FIG.1
(A)
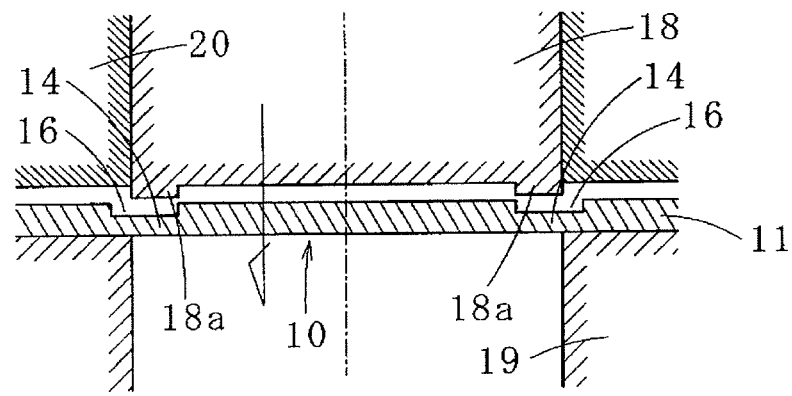
(B)
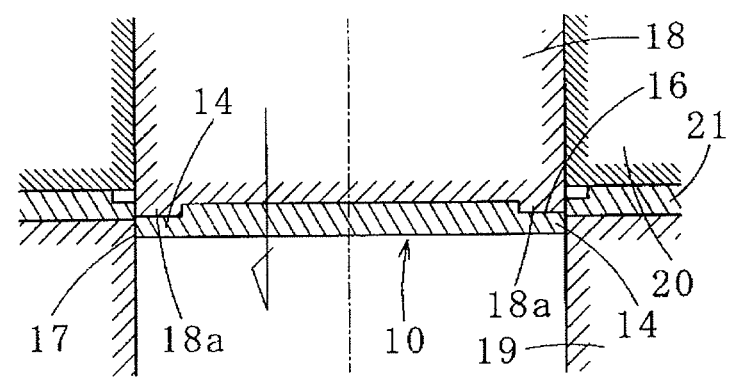
(C)
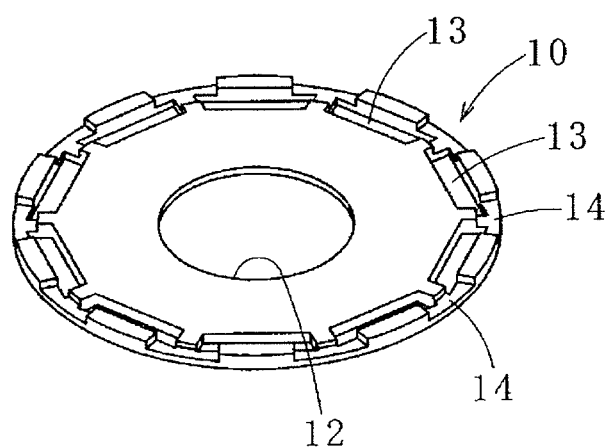

FIG.2
(A)
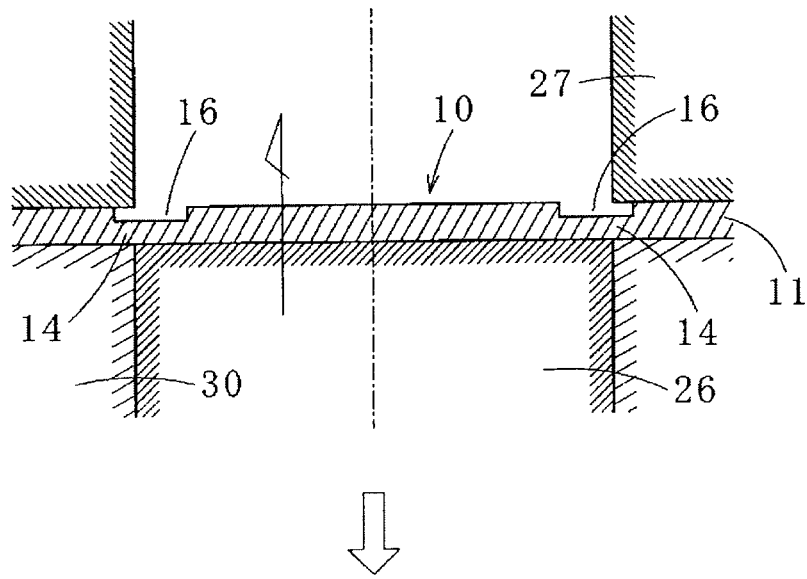
(B)
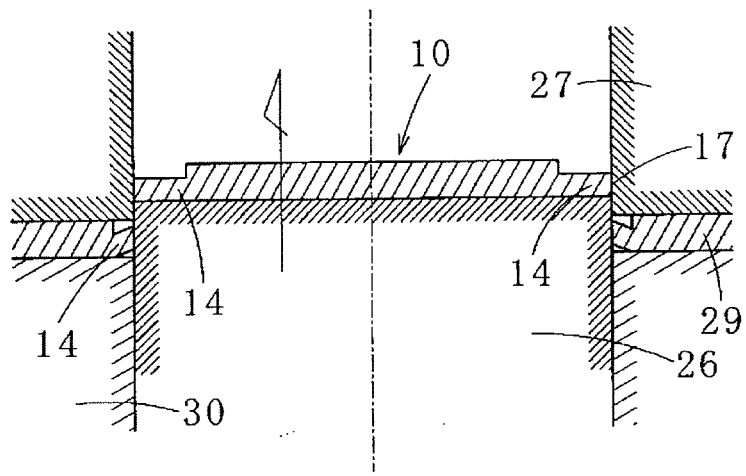

FIG.3
(A)
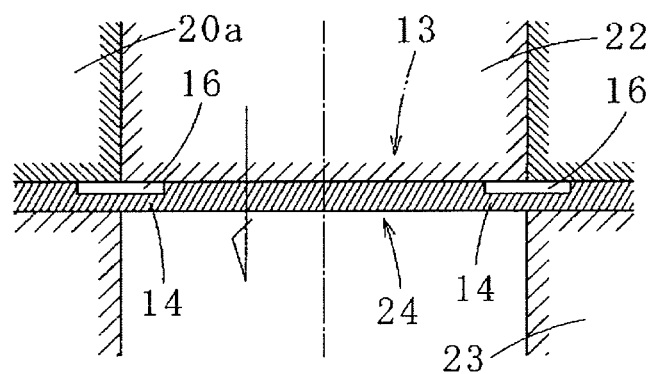
(B)
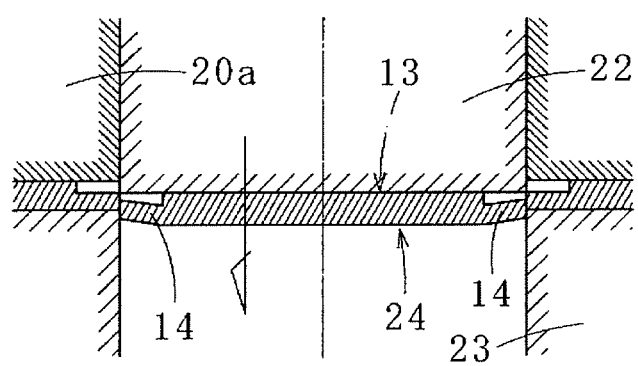

-- PRIOR ART -- FIG.4A
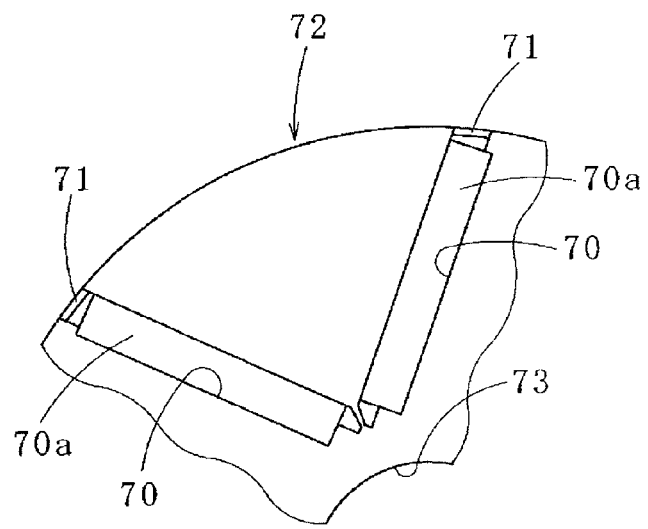
-- PRIOR ART -- FIG.4B
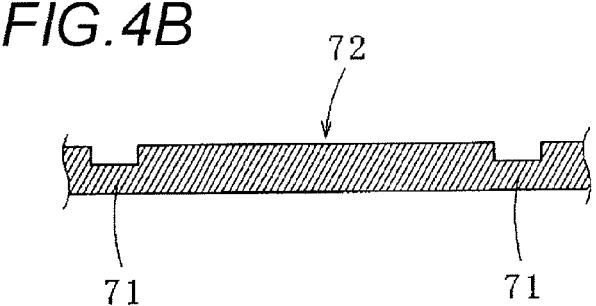

FIG.5
(A)
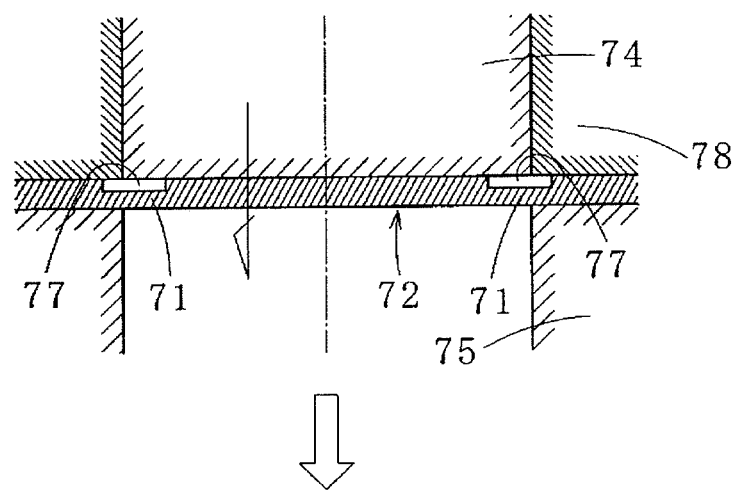
(B)
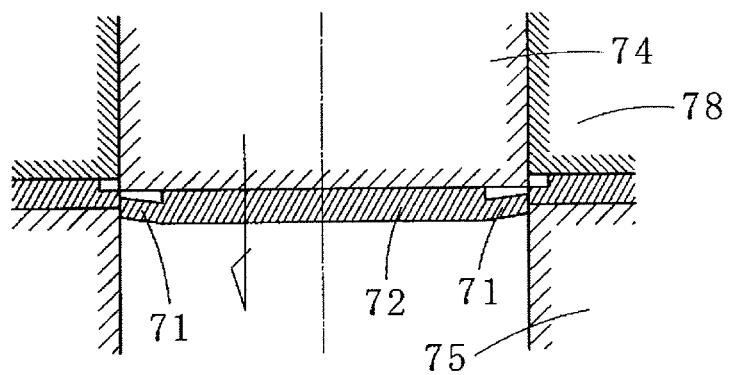

METHOD FOR MANUFACTURING LAMINATED IRON CORE

CROSS REFERENCE TO RELATED APPLICATIONS

This application is based upon and claims the benefit of priority of Japanese Patent Application No. 2014-125546 filed on Jun. 18, 2014, the contents of which are incorporated herein by reference in its entirety.

BACKGROUND OF THE INVENTION

1. Field of the Invention

The present invention relates to a method for manufacturing a laminated iron core (a rotor-laminated iron core or a stator-laminated iron core) having multiple punched holes (for example, magnet-insert holes) in its circumferential direction, using a motor.

2. Description of the Related Art

Recently, as disclosed in JP-A-2008-42967, there has been spread a motor using a rotor structured such that its rotor-laminated iron core having an axial hole in its center includes multiple magnet-insert holes in which corresponding permanent magnets are inserted and respectively resin-sealed.

However, when closed magnet-insert holes are formed in the rotor-laminated iron core, magnetic flux directed toward the front and back of the permanent magnets provides a magnetic path in the outer peripheral portions of the magnet-insert holes, thereby reducing the magnetic efficiency of the rotor. Thus, as shown in FIGS. 4A and 4B, there is proposed a method in which a bridge portion 71 formed between the end and outer periphery of a magnet-insert hole 70 of an iron core piece 72 forming a rotor-laminated iron core is plastically deformed by pressing to make the thickness of the plastic-deformed portion thinner than those of the remaining portions, thereby preventing an increase in torque variation, reducing the leakage magnetic flux and thus improving the efficiency of the motor (see JP-A-2006-50821 and JP-A-2012-16090). FIG. 4A shows a permanent magnet 70a and an axial hole 73.

Patent Literature 1: JP-A-2008-42967
Patent Literature 2: JP-A-2006-50821
Patent Literature 3: JP-A-2012-16090

SUMMARY OF THE INVENTION

However, as shown in (A) and (B) of FIG. 5, in the case that an iron core piece 72 forming the rotor-laminated iron core disclosed in JP-A-2006-50821 is formed by blanking using a progressive die, especially, in the case that, in forming the bridge portion 71, thin-wall processing is performed from the upper surface side of the iron core piece 72, in outer-shape blanking, there are produced clearances 77 between a punch 74 and bridge portions 71, whereby the punch 74 is disabled to touch the bridge portions 71 and thus the bridge portions 71 can be deformed outward in the radial direction (toward the outer peripheral edge of the iron core piece 72). Here, FIG. 5 also shows a die 75 and a stripper plate 78. Also, in the case that the bridge portions 71 are formed to extend over the outer peripheral edge of the iron core piece 72 and magnet-insert holes 70, such deformation is transmitted to the magnet-insert holes 70 as well.

Here, such problems arise similarly not only in the magnet-insert holes but also in other punched holes formed in the iron core piece.

The present invention has a non-limited object to provide a laminated iron core manufacturing method which, in punching or blanking an iron core piece, can prevent deformation of bridge portions formed between punched holes and the outer peripheral edge of the iron core piece.

A first aspect of the present invention provides a method for manufacturing a laminated iron core from a thin sheet, the method including: coining the thin sheet from above to form a thinned bridge portion on an outer peripheral portion of an iron core piece; blanking the iron core piece downwardly from the thin sheet using a set of an outer-shape blanking punch and a die after forming the bridge portion, wherein the outer-shape blanking punch includes a projection portion fitted into the bridge portion when blanking; and laminating the iron core piece on another iron core piece to manufacture the laminated iron core.

The method according to the first aspect may be configured such that the bridge portion is formed between a punched hole and an outer peripheral edge of the iron core piece.

A second aspect of the present invention provides a method for manufacturing a laminated iron core from a thin sheet, the method including: coining the thin sheet from above to form a thinned bridge portion between areas for a punched hole and an outer peripheral edge of an iron core piece, wherein the area for the punched hole is located at radial direction outside area of the iron core piece; forming the punched hole by punching the area for the punched hole from above by using a punch; blanking the iron core piece from the thin sheet by using an outer-shape blanking punch which is lowered and includes a projection portion fitted into the bridge portion when blanking; and laminating the iron core piece on another iron core piece in a die to manufacture the laminated iron core.

A third aspect of the present invention provides a method for manufacturing a laminated iron core from a thin sheet, the method including: coining the thin sheet from above to form a thinned bridge portion between areas for a punched hole and an outer peripheral edge of an iron core piece, wherein the area for the punched hole is located at radial direction outside area of the iron core piece; forming the punched hole by punching the area for the punched hole from above by using a punch; blanking the iron core piece upwardly from the thin sheet by using a set of an outer-shape blanking punch and a die which are located below and above respectively; and laminating the iron core piece on another iron core piece to manufacture the laminated iron core.

The method according to the third aspect may be configured such that the punched hole is formed by using a punch from above after forming the bride portion, a part of the punched hole being continuous to the bridge portion.

The method according to any one of the first to third aspects may be configured such that the laminated iron core is a rotor-laminated iron core, and the punched hole is a magnet-insert hole.

In the method for manufacturing the laminated iron core according to any one of the first and second aspects, since the outer-shape blanking punch includes the projection portion to be fitted into the bridge portion, no clearance is produced between the outer-shape blanking punch and the bridge portion and the projection portion supports the bridge portion, thereby enabling elimination or reduction of deformation of the bridge portion (especially, deformation toward the radial-direction outside).

Also, in the method for manufacturing the laminated iron core according to the third aspect, since the bottom surface (flat surface) of the thin bridge portion formed by coining is disposed on the lower side of the iron core piece and outer-shape blanking is performed from below, no clearance is produced between the outer-shape blanking punch and the bridge portion and the outer-shape blanking punch supports the bridge portion, whereby no bending force is applied to the bridge portion to enable elimination or reduction of deformation of the bridge portion.

Especially, in the method of any one of the second and third aspects, when the punched holes are formed from above using a punch, the bridge portion formed in the scrap piece of the punched hole is bent but the iron core piece as a product is prevented against bending or deformation.

In the method of any one of the first to third aspects, in the case that the laminated iron core is a rotor-laminated iron core and the punched hole is a magnet-insert hole, the magnetic efficiency of a permanent magnet inserted in the magnet-insert hole is enhanced.

BRIEF DESCRIPTION OF THE DRAWINGS

In the accompanying drawings:

FIG. 1 includes process explanatory views (A) and (B) of a laminated iron core manufacturing method according to a first embodiment of the present invention, and a perspective view (C) of an iron core piece;

FIG. 2 includes process explanatory views (A) and (B) of a laminated iron core manufacturing method according to a second embodiment of the present invention;

FIG. 3 includes process explanatory views (A) and (B) of a laminated iron core manufacturing method according to a third embodiment of the present invention;

FIG. 4A is an explanatory view of a conventional laminated iron core manufacturing method, showing a partial plan view of an iron core piece;

FIG. 4B is an explanatory view of a conventional laminated iron core manufacturing method, showing a partial section view of the iron core piece; and FIG. 5 includes process explanatory views (A) and (B) of another conventional laminated iron core manufacturing method.

DETAILED DESCRIPTION OF THE EXEMPLARY EMBODIMENTS

Description is given below of embodiments of the present invention with reference to the accompanying drawings.

In a laminated iron core manufacturing method according to a first embodiment of the present invention, multiple pilot holes (not shown) for determining the forming position of a required iron core piece 10 (see (C) of FIG. 1) are formed on width-direction two sides of a thin sheet 11 made of a silicon steel sheet. With these pilot holes as reference, there is punched an axial hole 12 and the like. Punching of the axial hole 12 may be performed first or after a coining processing to be described below.

According to the pilot holes, the forming positions of multiple magnet-insert holes (an example of punched holes) 13 to be formed in the radial-direction outside area of the iron core piece 10, thin bridge portions 14 to be formed on the radial-direction outside thereof (which exists between the magnet-insert holes 13 and the outer peripheral edge of the iron core piece 10 and includes the outer peripheral portion of the piece 10), and caulked portions (not shown) are determined respectively. In this embodiment, as shown in (A) of FIG. 1, the bridge portions 14 are formed first at specific positions of the thin sheet 11 by coining.

Since coining the thin sheet 11 can deform the thin sheet 11, coining (crushing) is performed first. Coining is a technology which plastically processes a portion of the thin sheet 11 to thin such portion, while thickness after coined may be about 50 to 80% of the thin sheet 11. Here, the above process can be applied to laminated iron core manufacturing methods according to the second and third embodiments of the present invention which are described later.

Coining of the thin sheet 11 is performed from the front side thereof (from above). That is, using an upper die including downward projecting bulged portions at specific portions and a lower die having a flat upper surface (neither of which is shown), by pushing up the lower die or by pushing down the upper die, the bridge portions 14 are formed at specific positions in the thin sheet 11. Each bridge portion 14 has a dent section 16 on its upper surface, while the upper surface of the bridge portion 14 (that is, the bottom surface of the dent section 16) is parallel to the surface of the iron core piece 10. As shown in FIG. 1, the bridge portion 14 of the thin sheet 11 is formed to extend beyond the circular outer peripheral edge 17 of the iron core piece 10.

In this state, the iron core piece 10 forming area of the thin sheet 11, specifically, the radial-direction outside area of the iron core piece 10 is pressed to form a required number of magnet-insert holes 13 and caulked portions.

When forming the caulked portions, according to a conventional method, in the first (existing at the bottom position) iron core piece 10, there is formed a caulked through hole; and, in iron core pieces 10 to be laminated on the first piece, there are formed ordinary caulked portions (for example, V-shaped caulked portions). Here, in this embodiment, the iron core pieces are laminated together by a laminating technique (connecting technique) using caulking. However, this is not limitative but, for example, other laminating techniques such as adhesion or welding may also be used, while lamination may be performed within or outside the die (this applies similarly in the following embodiments as well).

After then, as shown in (B) of FIG. 1, using a downward-moving outer-shape blanking punch 18, iron core pieces 10 are sequentially blanked from the thin sheet 11 into a die 19 and are caulked and laminated within the die 19 (accurately, squeeze ring). Here, the outer-shape blanking punch 18 includes, on its bottom surface, a projection portion 18a engageable into (fittable into) the bridge portion 14 existing in the inside area of the outer peripheral edge 17 of the iron core piece 10. The height of the projection portion 18a also coincides with the depth of the bridge portion 14 (dent section 16).

FIG. 1 shows operation states before and after the iron core pieces 10 are blanked into the die 19 using the outer-shape blanking punch 18 having the projection portion 18a and die 19. A stripper plate 20 is also provided. In FIG. 1, (C) shows the front side of the iron core piece 10 with its outer periphery blanked by the outer-shape blanking punch 18 and die 19. Here, the radial-direction outside of the projection portion 18a coincides with the outer peripheral circle (outer peripheral edge 17) of the iron core piece 10 and it combines with the die 19 having a circular shape in its plane view to form a cutter.

In the above-mentioned laminated iron core manufacturing method of the first embodiment, the outer-shape blanking punch 18 includes the projection portion 18a in its bottom portion and, in blanking the iron core piece 10 downward, the projection portion 18a is contacted with the bridge portion 14, the bridge portion 14 existing in the iron core piece 10 is prevented against bending and deformation.

Meanwhile, since the bridge portion 14 situated on the radial-direction outside of the iron core 10 constitutes a portion of a scrap piece 21, it has no influence on the precision of the iron core piece 10.

Next, referring to (A) and (B) of FIGS. 2 and 3, description is given of laminated iron core manufacturing methods according to second and third embodiments of the present invention, respectively. The same constitute elements as those of the iron core piece 10 manufactured according to the laminated iron core manufacturing method of the first embodiment are given the same numerals and thus the specific description thereof is omitted here.

According to a method similar to the laminated iron core manufacturing method of the first embodiment, areas connecting together the magnet-insert holes 13 and the outer peripheral edges 17 of the iron core pieces 10 are coined from above to form dent sections 16, thereby forming bridge portions 14.

After then, through processes shown in (A) and (B) of FIG. 3, there are formed magnet-insert holes 13. When the magnet-insert holes 13 are punched from above using a downward-moving hole punch 22 and a stationary die 23, the bridge portions 14 extended to the ends of the magnet-insert holes 13 are bent. The reason for this is that, since there is nothing to support the downward movement of the bridge portion 14 adjoining the magnet-insert hole 13, it is pulled downward by a scrap piece 24 produced when forming the magnet-insert hole 13. Here, since the scrap piece 24 is not a product either, even when the scrap piece 24 is partially deformed, there is no problem in particular. FIG. 3 also shows a stripper plate 20a. The foregoing is the laminated iron core manufacturing method of the third embodiment of the present invention.

Next, according to a method shown in (A) and (B) of FIG. 2, the iron core piece 10 is separated from the thin sheet 11. In this case, an outer-shape blanking punch 26 is disposed vertically movably within a lower die, whereas a die 27 to be paired with the outer-shape blanking punch 26 is disposed within an upper die. In order to secure the passage of the thin sheet 11, the die 27 may preferably be moved vertically within a small range. The thin sheet 11 is positioned at a specific position by a pilot pin, while the outer-shape blanking punch 26 is moved upward from below.

Thus, the iron core piece 10 is separated from the thin sheet 11 and the bridge portion 14 is divided to the iron core piece 10 side and scrap piece 29 side. However, since the bridge portion 14 on the iron core piece 10 side is supported by the outer-shape blanking punch 26 having a flat ceiling surface, it is prevented against deformation. Meanwhile, the bridge portion 14 on the scrap piece 29 side is deformed but, since it is not a product, there is no problem in particular.

After then, the iron core pieces 10 are laminated within the die 27 and are connected together by proper connecting technique such as caulking, adhesive and welding. Here, FIG. 2 also shows a stripper plate 30. Also, in the above embodiments, formation of pilot holes, central circular punched holes (for example, shaft holes) and, as the need arises, caulked portions are known well and thus description thereof is omitted. The foregoing is the laminated iron core manufacturing method of the second embodiment of the present invention.

The present invention is not limited to the above embodiments but the structure thereof can be varied without changing the subject matter of the present invention. For example, the shapes and number of the magnet-insert holes and the like are arbitrary and, further, the shape and position of the bridge portion are not limited to the above embodiments.

Also, the present invention is not limited to a rotor-laminated iron core but can be also applied to a stator-laminated iron core so long as it includes a bridge portion in its outer peripheral portion.

Further, the punched hole includes a through hole for weight reduction as well.

What is claimed is:

1. A method for manufacturing a laminated iron core from a thin sheet, the method comprising:
   coining the thin sheet from above to form a thinned bridge portion on an outer peripheral portion of an iron core piece;
   blanking the iron core piece downwardly from the thin sheet using a set of an outer-shape blanking punch and a die after forming the bridge portion, wherein the outer-shape blanking punch includes a projection portion fitted into the bridge portion when blanking; and
   laminating the iron core piece on another iron core piece to manufacture the laminated iron core.

2. The method according to claim 1, wherein the bridge portion is formed between a punched hole and an outer peripheral edge of the iron core piece.

3. The method according to claim 2, wherein the laminated iron core is a rotor-laminated iron core, and the punched hole is a magnet-insert hole.

4. A method for manufacturing a laminated iron core from a thin sheet, the method comprising:
   coining the thin sheet from above to form a thinned bridge portion between areas for a punched hole and an outer peripheral edge of an iron core piece, wherein the area for the punched hole is located at radial direction outside area of the iron core piece;
   forming the punched hole by punching the area for the punched hole from above by using a hole-blanking punch;
   blanking the iron core piece from the thin sheet by using an outer-shape blanking punch which is lowered and includes a projection portion fitted into the bridge portion when blanking; and
   laminating the iron core piece on another iron core piece in a die to manufacture the laminated iron core.

5. The method according to claim 4, wherein the laminated iron core is a rotor-laminated iron core, and the punched hole is a magnet-insert hole.

6. A method for manufacturing a laminated iron core from a thin sheet, the method comprising:
   coining the thin sheet from above to form a thinned bridge portion between areas for a punched hole and an outer peripheral edge of an iron core piece, wherein the area for the punched hole is located at radial direction outside area of the iron core piece;
   forming the punched hole by punching the area for the punched hole from above by using a hole-blanking punch;
   blanking the iron core piece upwardly from the thin sheet by using a set of an outer-shape blanking punch and a die which are located below and above respectively; and
   laminating the iron core piece on another iron core piece to manufacture the laminated iron core.

7. The method according to claim 6, wherein the punched hole is formed by using the hole-blanking punch from above after forming the bridge portion, a part of the punched hole being continuous to the bridge portion.

8. The method according to claim 6, wherein the laminated iron core is a rotor-laminated iron core, and the punched hole is a magnet-insert hole.

9. The method according to claim 1, wherein the projection portion protrudes downwardly from an outermost periphery of the outer-shape blanking punch.

10. The method according to claim 4, wherein the projection portion protrudes downwardly from an outermost periphery of the outer-shape blanking punch.

11. The method according to claim 6, wherein an entire opposing face of the outer-shape blanking punch contacts an opposing surface of the iron core piece.

* * * * *